July 27, 1943.　　　C. W. COVER　　　2,325,374
PELLETING MACHINE
Filed May 7, 1942　　　2 Sheets-Sheet 1
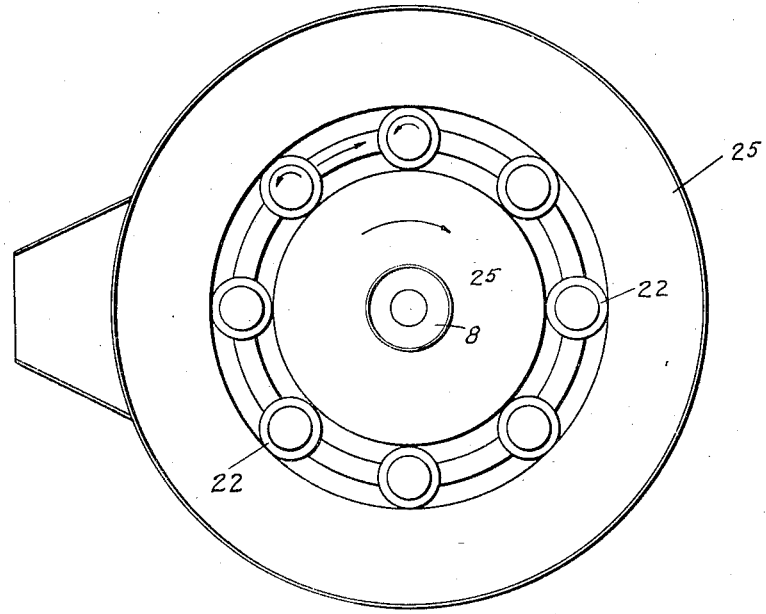
Fig. II
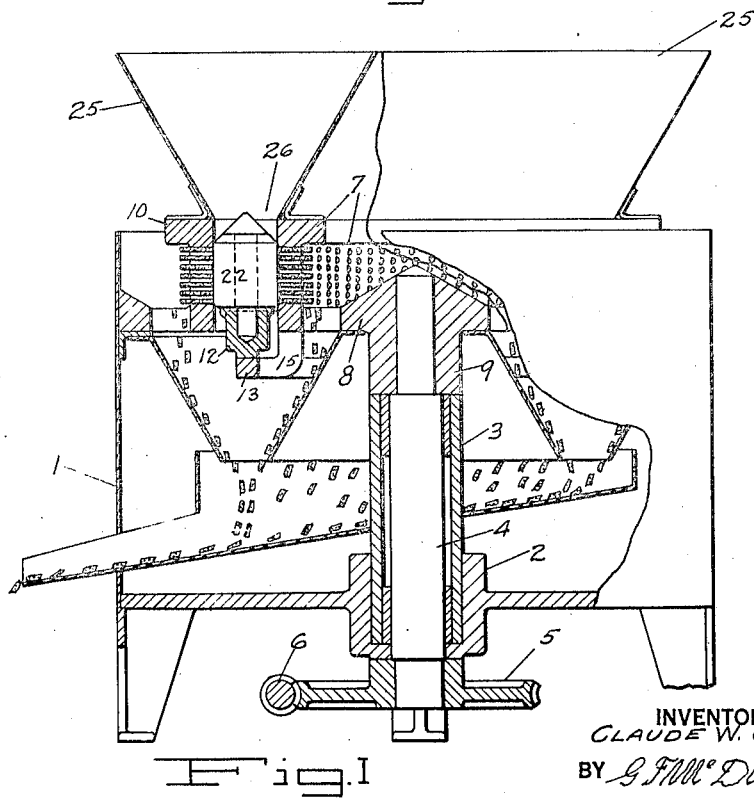
Fig. I
INVENTOR
CLAUDE W. COVER
BY G. F. McDougall
ATTORNEY July 27, 1943.  C. W. COVER  2,325,374
PELLETING MACHINE
Filed May 7, 1942  2 Sheets-Sheet 2
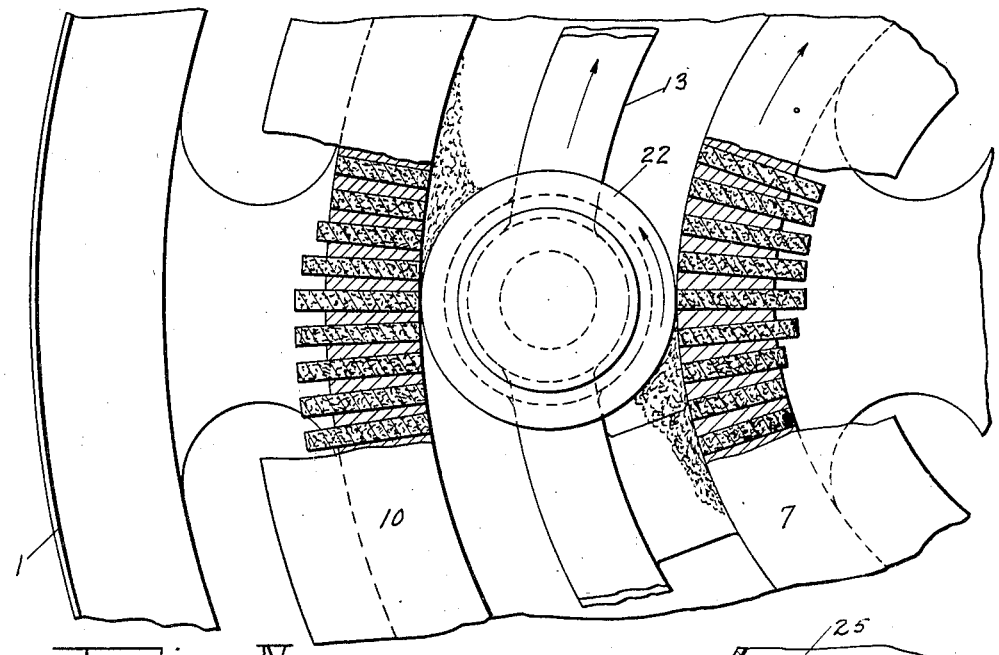
Fig. IV
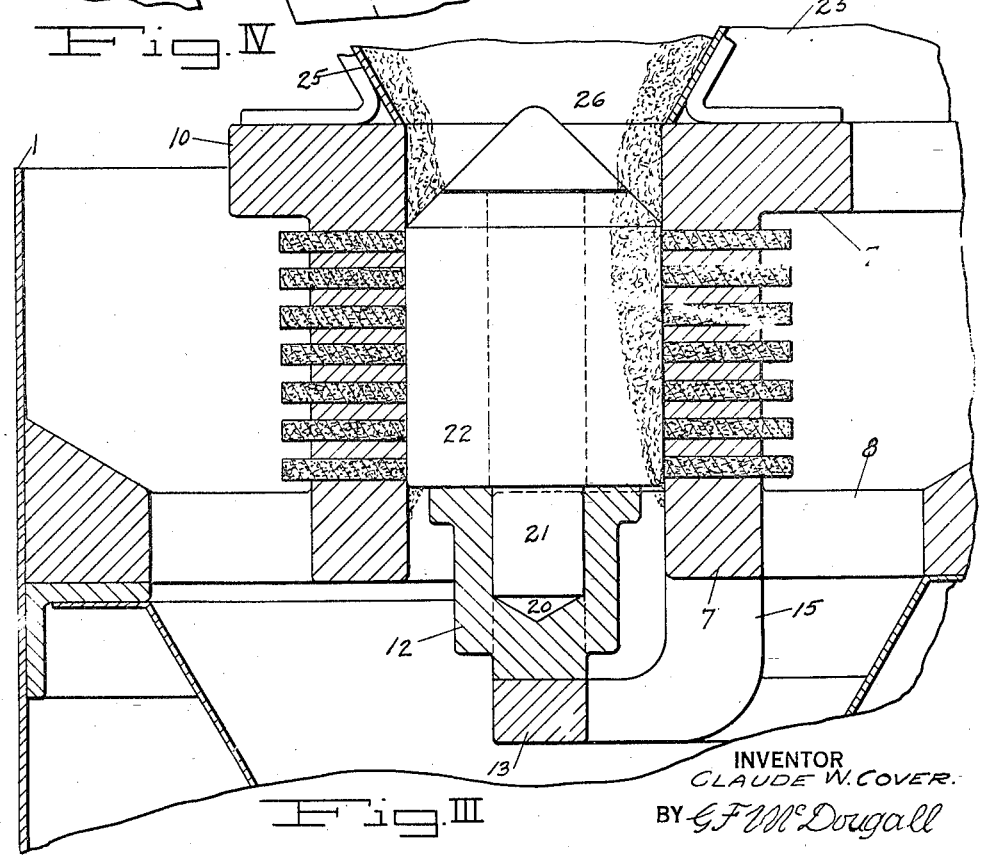
Fig. III
INVENTOR
CLAUDE W. COVER.
BY G.F.McDougall
ATTORNEY Patented July 27, 1943

2,325,374

UNITED STATES PATENT OFFICE 2,325,374

PELLETING MACHINE

Claude W. Cover, Portland, Oreg.

Application May 7, 1942, Serial No. 442,119

3 Claims. (Cl. 107—8)

This invention relates to an improved pelleting machine.

Pelleting machines are well known to the art and in wide use. Pelleting machines consist of a die, or dies, each containing a large number of holes and means for forcing damp ground feed through the holes to produce pellets for feeding poultry, this system being established as the best way of making cereals available as poultry feed.

Owing to the non-plastic nature of damp ground cereal, a large amount of power is required to force the feed through the dies, the greater part of which, in some forms of the machine, appears as heat. Since this heat can be dissipated only by convection and radiation, and relatively high speed is required to get an amount of production commensurate with operating economy, it is important to so devise a machine that speed is relatively low and production much higher than in any existing type. The solution of this problem is the principal object of the present invention. Other objects will be at once apparent to those familiar with the building and operation of pelleting machines, from reading the following disclosure.

Drawings accompany and form a part hereof, being in part diagrammatic as will appear. In the drawings, Fig. I is an elevation of a machine of preferred form, partly sectioned to show the operating die and its relation to the relatively fixed die, though both are classifiable as operating parts;

Fig. II is a plan view of the machine shown in Fig. I;

Fig. III is an enlarged sectional view showing details of parts of Fig. I showing the stationary die, the moving die and the planetary roller system, all to be described in more detail, and also showing pellets in process of formation by compression through the dies; and Fig. IV is a plan view of the structure shown in Fig. III.

Further describing the drawings, I is a frame containing a bearing 2, to which is joined an extension sleeve 3, and within which is mounted a powerful shaft 4, shown diagrammatically to be driven by a worm wheel 5 which is in turn driven by a worm gear 6 which will be assumed to receive turning moment in appropriate amount and velocity to revolve the worm wheel 5 and with it the shaft 4, the source of power not being shown.

On the upper end of the shaft 4 is a die member 7 made rigid with a spider 8 and a hub member 9, the latter being made rigid with the shaft 4 to turn it. The die portion of this structure is formed as an annular upstanding flange as shown clearly in Fig. III.

Made secure to the frame I is an annular fixed die member 10 that is larger in its inside diameter than the outside diameter of the die 7, the outside surface of which is mounted in concentric relationship with the inside surface of the die 10. Each die will be provided with as many closely spaced holes as is consistent with the strength of the structure to resist the very considerable compressive forces to be applied, as diagrammatically indicated in the figures, particularly Fig. I.

A floating roller carrier 12 rests on a support 15, which is made with a plurality of arms 13, which arms also act as an additional support for the die 7, being made rigid with the frame I at 16.

The roller carrier 12 is provided with a plurality of sockets 20, within which are secured the carrier studs 21. Mounted on the carrier studs 21 are cylindrical rollers 22, and the resemblance to a roller bearing will be at once seen, with its spaced rollers and planetary motion. The surface of these rollers 22 is preferably sharp fluted after the manner of rolls in a roller mill, but this has been omitted from the drawings for clarity.

Superposed above the rollers is a hopper member 25 having an annular reduced portion at 26 adapted to direct its contents to fall by gravity between the spaces afforded by spacing the rollers where, as is at once evident, a part of it will be forced through each of the dies and be compressed into pellets by the planetary movement of the rollers. Shearing means, well known to the art, will be employed to cut the formed pellets off as usual but have been omitted from the drawings as the art well understands how to apply and use them.

The floating ring 12, is carried around like the carrier of a roller bearing and it is to be noted as in a bearing that the roller carrier 12 revolves slower than the die member 7 from which it receives indirect frictional impulse and that each roller, with respect to its frictionally applied turning movement, is entirely independent of all of the others, save that if it tends to slip due to poverty of feed at its particular location, it will be carried along by impulse received from the carrier 12 supplied by other rollers which have power to spare.

It will be seen at once that I have provided a pelleting machine wherein each roller is balanced as to application of transmitted power, to force material through the dies in equal amounts but in opposite directions, thus doubling the capacity of each roller.

Eight rollers are shown, but this number is by no means limiting. However, if the machine will be built with that number, it can run only one-sixteenth of the speed required for a single roller to force feed through a single die. It will be noted also that owing to the balanced load on the pins 21 upon which the rollers turn, there will be a very light friction load on these pins, making them easily kept free to turn in a situation difficult to adequately lubricate.

While I have shown what I consider the best form of the machine, it will be obvious that it can be made with the dies in a vertical plane instead of horizontal by structural changes easily made by a competent machine designer; and also the inner die may be fixed with the outer one revolving, to achieve substantially the same result; therefore the drawings are not to be considered as showing the only way the machine can be made.

Having disclosed my invention in a manner adequate to permit the art to construct it and having explained its principle of operation, what I claim as new and desire to secure by Letters Patent, is:

1. A pelleting machine comprising two annular die members, one of which is relatively fixed, the other being revoluble under influence of power, the said dies in the same plane, coaxial, and one spaced inside of the other, a plurality of rollers distributed around the space between the dies and of such size that they are adapted to planetary movement under influence of frictional power transmission when one die is revolved with respect to the other, and means for feeding material to the spaces between the rollers and the dies to be forced through the dies for pellet formation.

2. A pelleting machine comprising a pair of coaxial annular die members, each being provided with a plurality of radial holes spaced therethrough, said die members mounted in the same horizontal plane, one being spaced inside of the other with an annular feed chamber therebetween, a roller carrier disposed in and partly occupying said space, a plurality of rollers mounted for revolution on said carrier with their axes parallel to the axis of the dies, being adapted to revolve with the carrier in planetary movement when the inside die is revolved with respect to the outside die, means for supplying pellet material to the irregular spaces between the rollers and the die faces and means for revolving the inside die.

3. In a pelleting machine, a cooperating pair of coaxial perforated annular pelleting dies, one disposed inside the other, in the same plane and being of such respective inside and outside diameter that a space is provided between them, a plurality of axially parallel rollers disposed between the inside of the larger die and the perimeter of the smaller die and mounted for revolution under influence of friction when one die is revolved and the other held in fixed position, means for revolving one of the dies and means for supplying pellet material between the dies and the rollers as the driven die and the rollers revolve.

CLAUDE W. COVER.